United States Patent [19]
Riedel et al.

[11] Patent Number: 5,873,479
[45] Date of Patent: Feb. 23, 1999

[54] DEVICE FOR ENSURING THE TRANSPORT OF CONTAINERS

[75] Inventors: Norbert Riedel, Rheinberg; Ludger Riedel, Xanten, both of Germany

[73] Assignee: Riedel Und Sohne oHG, Kamp-Lintfort, Germany

[21] Appl. No.: 795,934

[22] Filed: Feb. 5, 1997

Related U.S. Application Data

[63] Continuation of Ser. No. 301,631, Sep. 7, 1994, abandoned.

[30] Foreign Application Priority Data

Sep. 7, 1993 [DE] Germany .............. 43 30 252.1

[51] Int. Cl.⁶ ............................. B65D 88/12
[52] U.S. Cl. ............... 220/1.5; 220/512; 410/77; 206/516
[58] Field of Search ................ 224/539, 42.32, 224/925, 42.33; 206/386, 516; 414/498; 410/46, 77, 78, 84, 85, 129, 79; 220/1.5, 512, 516, 517; 294/68.1; 108/55.3

[56] References Cited

U.S. PATENT DOCUMENTS

| | | | |
|---|---|---|---|
| 2,293,160 | 8/1942 | Miller et al. .............. | 220/1.5 |
| 2,337,131 | 12/1943 | Schroeder et al. ........ | 410/78 |
| 2,922,517 | 1/1960 | Nordquist et al. ........ | 220/1.5 |
| 4,132,325 | 1/1979 | Corompt .................. | 414/498 |
| 4,488,669 | 12/1984 | Waters ...................... | 224/404 |
| 4,770,330 | 9/1988 | Bonstead et al. ......... | 224/404 |
| 4,911,318 | 3/1990 | Bishop ...................... | 220/1.5 |
| 5,092,252 | 3/1992 | Gilhart ..................... | 108/5.3 |
| 5,169,194 | 12/1992 | Yamashita et al. ....... | 414/498 |

FOREIGN PATENT DOCUMENTS

| | | | |
|---|---|---|---|
| 359116 | 9/1922 | Germany . | |
| 2232319 | 1/1974 | Germany . | |
| 2737705 | 10/1978 | Germany ............. | 108/55.3 |
| 4008619 | 10/1991 | Germany . | |
| 4330252 | 7/1995 | Germany . | |

*Primary Examiner*—Linda J. Sholl
*Attorney, Agent, or Firm*—Watson Cole Grindle Watson, P.L.L.C.

[57] ABSTRACT

A device for ensuring the transport of tanks in the form of containers with a truck so as to prevent the containers on the truck from sliding during the trip includes at least two holding supports attached in such a manner to a holding frame that pairs of holding supports are opposite each other and between them form a space for the shape-locking accommodation of the container, a container put into the space between the holding supports, and a holding frame connected to the respective bearing surface of the truck transported on water, by land or in the air.

12 Claims, 5 Drawing Sheets

FIG. I

DEVICE FOR ENSURING THE TRANSPORT OF CONTAINERS

CROSS-REFERENCE TO RELATED APPLICATION

This is a continuation of application Ser. No. 08/301,631, filed Sep. 7, 1994, now abandoned.

BACKGROUND OF THE INVENTION

The invention relates to a device for ensuring the transport of at least one container with a truck so as to prevent the container from sliding on the truck during travel.

A container disposal arrangement with a mobile crane with hydraulically operated gripping tongs, suspended rotatably from a mobile crane, is disclosed in German Patent 40 08 619. The gripping tongs include two opposing jaws that can be slid hydraulically in opposite directions and include two gripping claws. This container disposal arrangement works with many identical containers which include opposing claw engagement pockets that are open externally and are intended for the gripping claws. As a container, a tank is provided that tapers conically toward the bottom and to whose upper end a collar with vertical and parallel walls is attached. To manipulate the container, i.e., to lift, tilt and lower it, the upper region of the container has claw engagement pockets into which the gripping claws of the gripping jaws reach.

The containers used in the known container disposal arrangement have a height of 1 m and a width of 1 m and a length of 1.20 m, and thus have a volume of about 1 m³. The usual maximum fill weight of these containers is about 2 tons.

The bottom end of the collar has a shoulder extending around the container so that the container can stand not only on the ground but can also be positioned on the circumferential shoulder above the ground.

These containers are placed in succession in two rows onto the loading platform of the truck for the purpose of transporting them on a truck and are tied down with a belt or the like to prevent them from sliding sideways, because it is not enough to transport the containers loosely on the platform of the truck, since the side platform gates of a truck do not offer adequate safety against sideways sliding of the containers.

The procedure of tieing down the containers is time-consuming and does not offer in every case the guarantee that the containers on the loading platform will not slide sideways as happens in road traffic, since the tiedown of a container can become loose or detach itself owing to the unevenness of the road and owing to the side acceleration while driving through curves.

A device for transporting containers holding liquid materials is disclosed in German Patent Publication 22 32 319. In this device liquid containers of the same or different sizes are collected into one transport unit on trucks, especially tank trucks, and held together by means of an anchoring mechanism. The loading platform is connected detachably to the chassis of the truck via locking elements. In so doing, the loading platform includes a support frame, exhibiting crossbars, between which the spacing matches the side dimensions of the smallest container to be transported. The corners of the loading platform are provided with container corner fittings. In addition, the loading platform has pockets to receive the container feet. This known device has locking elements which are supposed to be operated together for the transport containers.

SUMMARY OF THE INVENTION

The present invention has as its object to improve in such a manner a device of the kind referred to above that one or multiple tanks designed as containers can be deposited on the planned spot(s) on the device, and any sliding of the tanks or containers in the device is prevented with certainty.

To solve this problem the invention provides that at least two holding supports are attached in such a manner to the holding frame that pairs of holding supports are opposite each other and between them form a space for the shape-locking accommodation of the container, the container is put into the space between the holding supports, and the holding frame is connected to the respective bearing surface of a vehicle movable over water, on land, or in the air (boat, truck or aircraft).

Thus, the result is a device for ensuring the transport of containers with a truck so as to prevent the containers from sliding on the truck during the trip; with which vehicle containers can be transported reliably without sliding, so that a suitable truck can also be a road truck, which exhibits the necessary safety in road traffic.

The holding frame can be connected detachably or non-detachably to the respective bearing surface of the truck. Such a detachable connection means that the connection can be disconnected rapidly and without further effort and can be reattached. The nondetachable connection does not mean that the connection cannot be disassembled with appropriate tools.

The holding supports are adapted expediently to the shape of the container to be secured and are diametrically opposed. This means that there are, for example, two holding supports whose upper end is L-shaped, whereby the container to be secured must be secured between the two L-shaped components. It is also possible to provide one holding support each in the region of the two broadsides and in the region of the two longitudinal sides; the holding supports are arranged in pairs opposite each other. In this manner, too, the containers are prevented with certainty from sliding both in the longitudinal direction of the vehicle and at right angles to the longitudinal direction of the vehicle.

The holding frame can be designed from holding profiles which are situated at right angles and longitudinally to the direction of travel and which are attached to the holding supports, forming a frame around the space for the container to be put into the space.

The holding frame can be designed expediently as a fixing frame or as bearing surface or loading surface of the truck. The holding frame can be attached to the holding supports at the foot or at a height above the foot of the holding supports. It is recommended that the holding supports be designed as limiting supports. The limiting supports are designed expediently with flat surfaces.

The platform gates of the truck can serve as the holding supports.

Cross beams can be laid on the platform gates of the truck and attached thereto; the containers can be put between the cross beams.

Similarly longitudinal beams, for example at least one center longitudinal beam, can be laid on the front walls of the truck and be attached thereto.

In another embodiment of the invention the container can be positioned in the space so as to be suspended on the limiting supports on a bearing located at the container, for example a collar, in such a manner that the floor of the container does not quite make contact with the bottom of the fixing frame or the bearing surface of the truck.

Correspondingly the device can also be designed in such a manner that the container is positioned in the space so as to stand on the bottom of the fixing frame or the bearing surface or the loading surface of the truck in such a manner that a collar situated on the container does not quite make contact with the upper edges of the limiting supports.

Multiple chambers forming the spaces can be provided side-by-side and in succession.

It is recommended that the device be designed in such a manner that the distance between the limiting supports standing side-by-side corresponds to the length of a tank or container below its collar, plus a requisite movement play.

Correspondingly it can also be provided that the distance between the limiting supports standing in succession corresponds to the width of a tank or container below its collar, plus a requisite movement play.

The problem on which the invention is based is also solved in that a lattice-like framework is provided with space above the bearing surface of a road vehicle; the framework includes several crossbars, a center longitudinal beam, and one side beam each on both longitudinal sides of the transport device; and tanks which are designed as containers are supposed to be put into the spaces between the crossbars, the center longitudinal beam and the side beams.

Thus, the result is a device with which multiple identical containers can be accommodated and with which it can be guaranteed that the containers will not slide at right angles to the direction of travel or in the direction of travel. Thus, the safety of road traffic is increased and the transport of containers is reliable without additional precautionary measures for securing the containers. Putting the containers into the appropriate spaces of the frame is no problem. The containers arranged in the spaces are guaranteed not to slide sideways, so that it is no longer necessary to tie down the containers on the loading surface of the truck.

In another embodiment of the invention runners can be provided on the bottom frame, whereby supports, which point perpendicularly to the top and on which the frame is positioned, are attached to the runners. The result is a stable positioning of the frame at a constant height above the runners.

It is recommended that the containers be positioned with the collar on the crossbars. Thus, the containers are positioned on the crossbars so as to hang without touching the floor or a platform. At the same time the result is that the transport device is comparatively light-weight due to the lack of a platform or a bottom.

Expediently the distance between the neighboring crossbars corresponds to the width of a container below the collar, plus a requisite movement play. Thus, it is ensured that the containers are put into the spaces between two adjoining crossbars by means of a crane without any difficulties and can be lifted off again from the crossbars. At the same time it is guaranteed that the containers are positioned securely on the crossbars, without falling off the crossbars.

The invention will be explained in more detail in the following with reference to the attached drawings.

DETAILED DESCRIPTION OF THE PREFERRED EMBODIMENT

Figure 1:
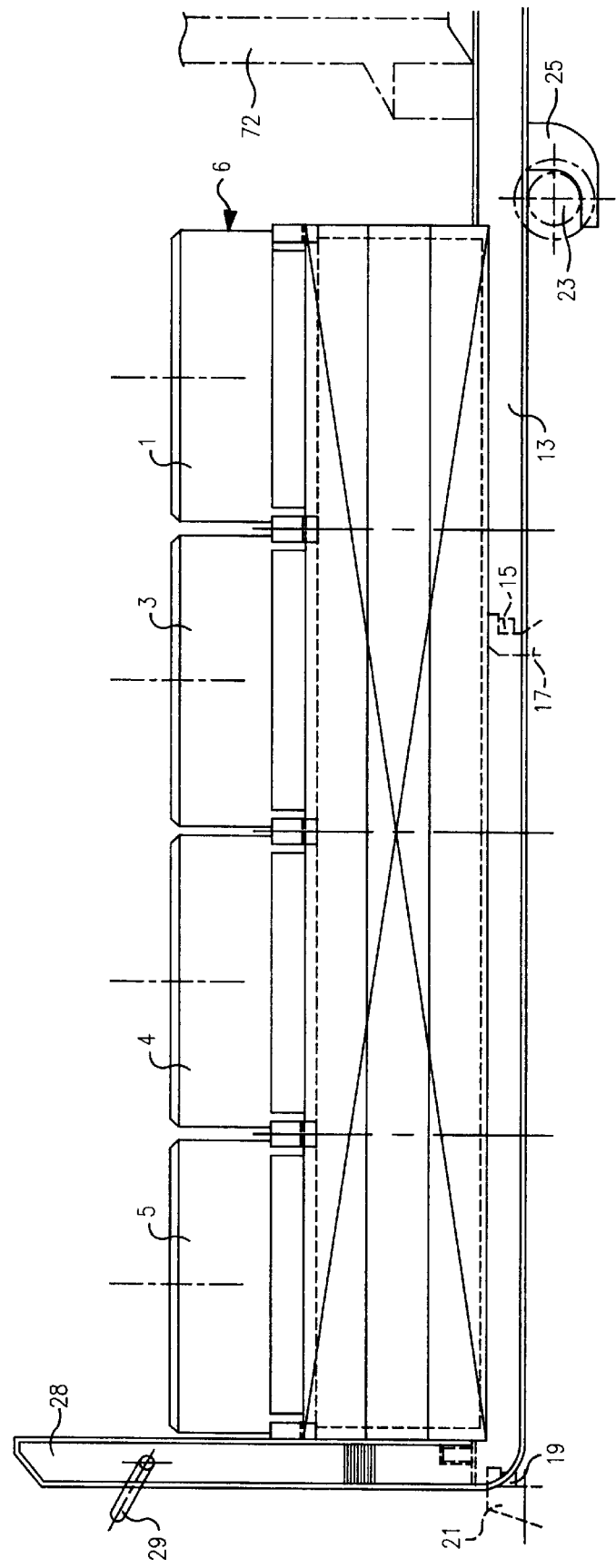
FIG. 1 is a side view of a transport device designed according to the invention.
Figure 2:
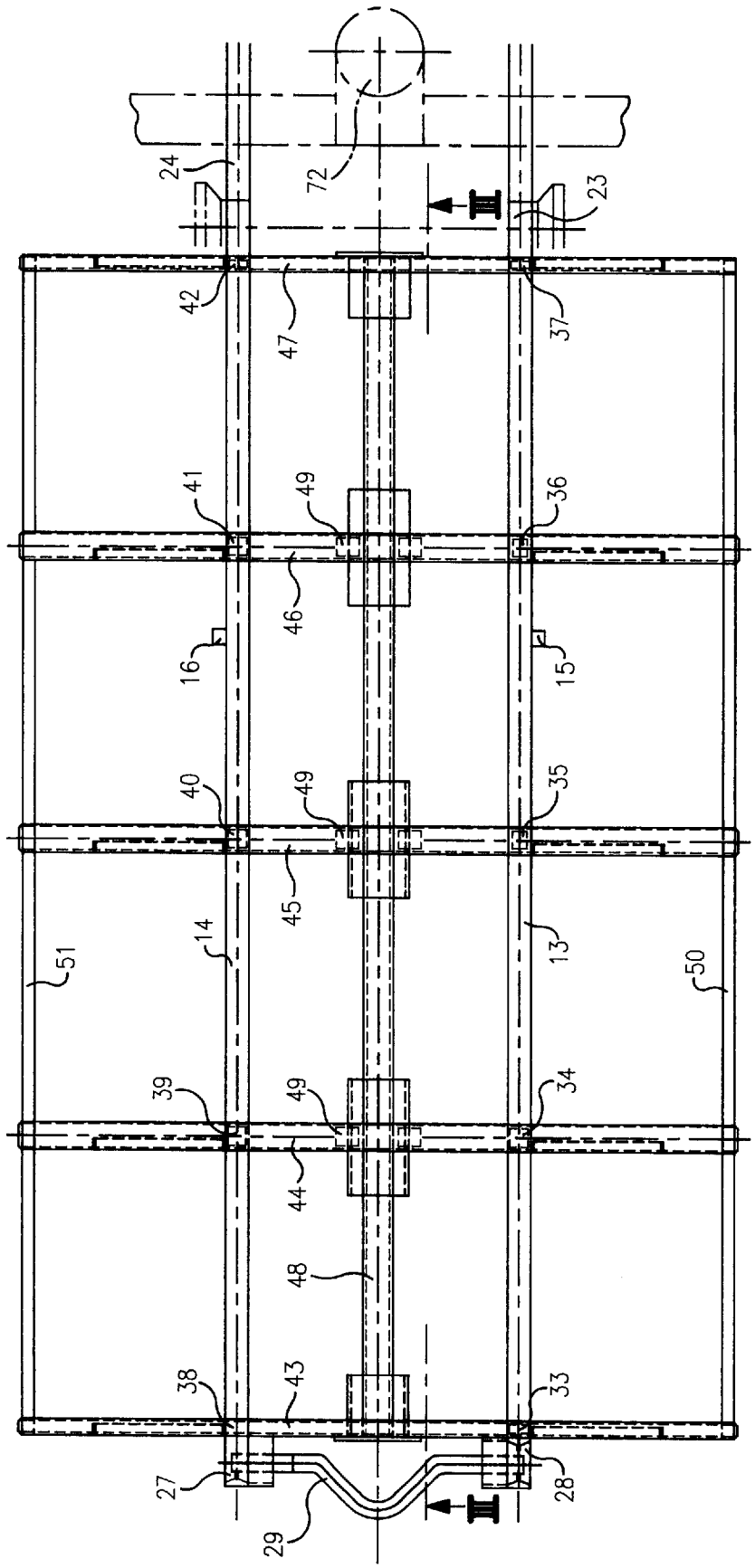
FIG. 2 is a top view of FIG. 1.
Figure 3:
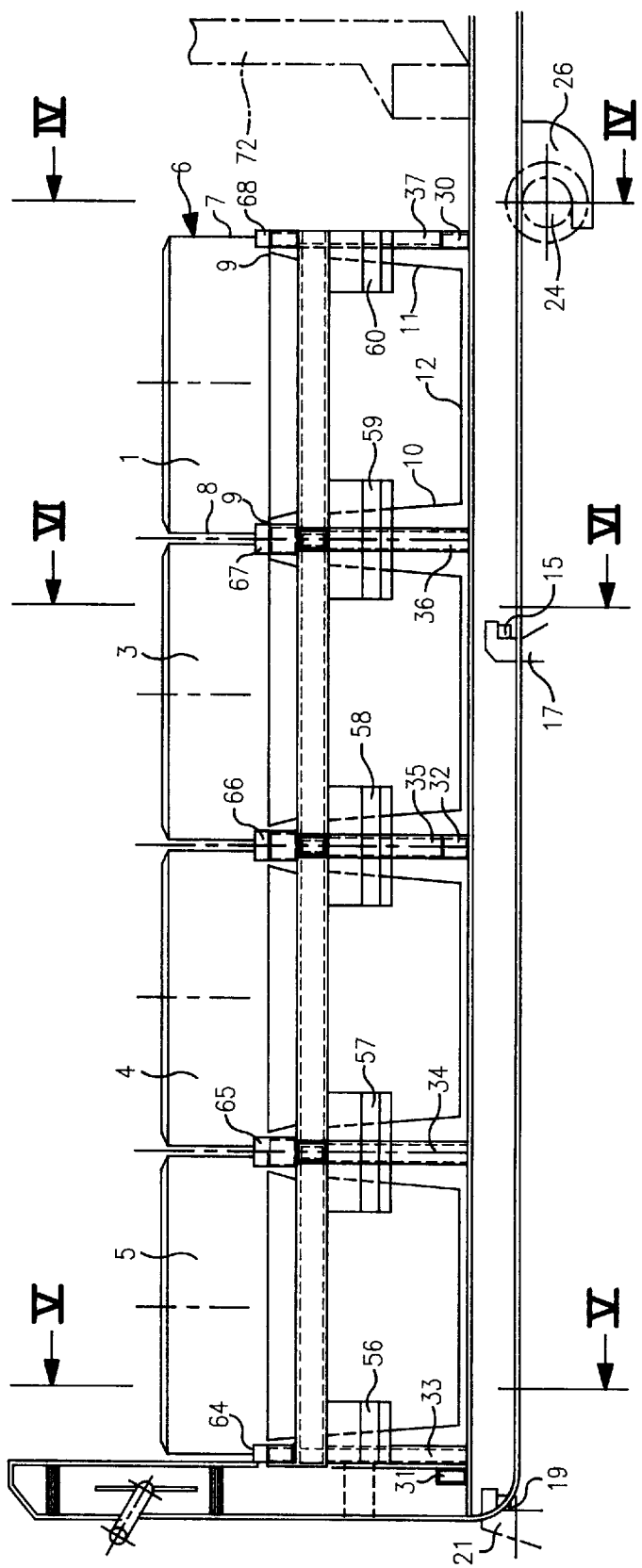
FIG. 3 is a sectional view along line III—III of FIG. 2.
Figure 4:
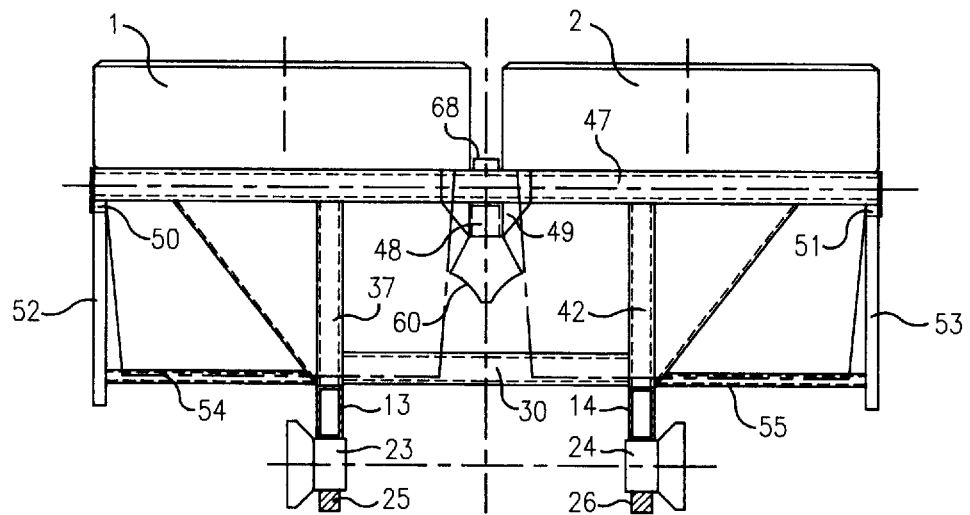
FIG. 4 is a sectional view along line IV—IV of FIG. 3.
Figure 5:
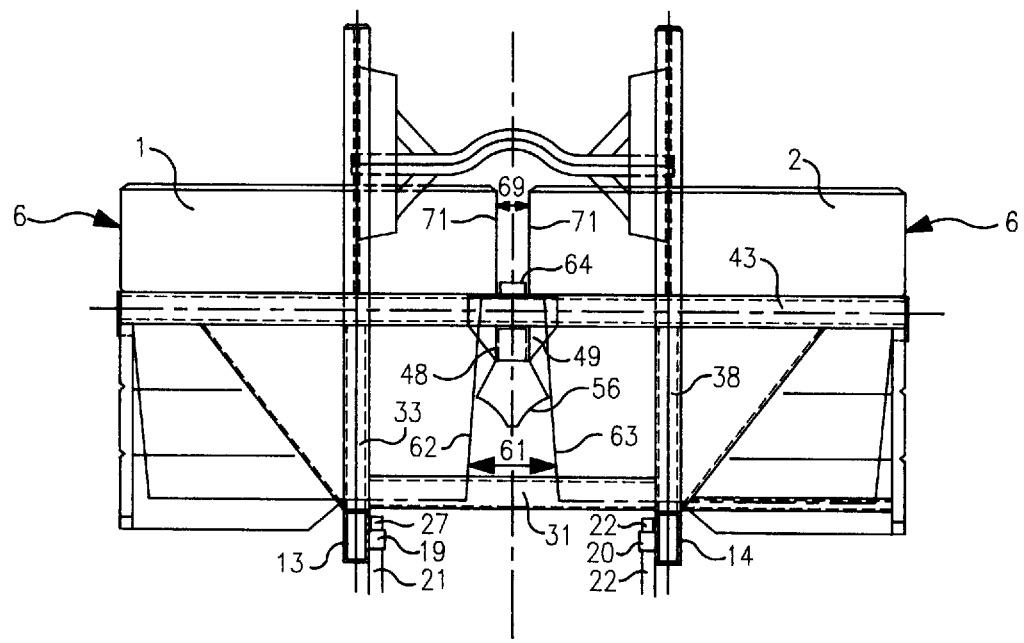
FIG. 5 is a sectional view along line V—V of FIG. 3.
Figure 6:
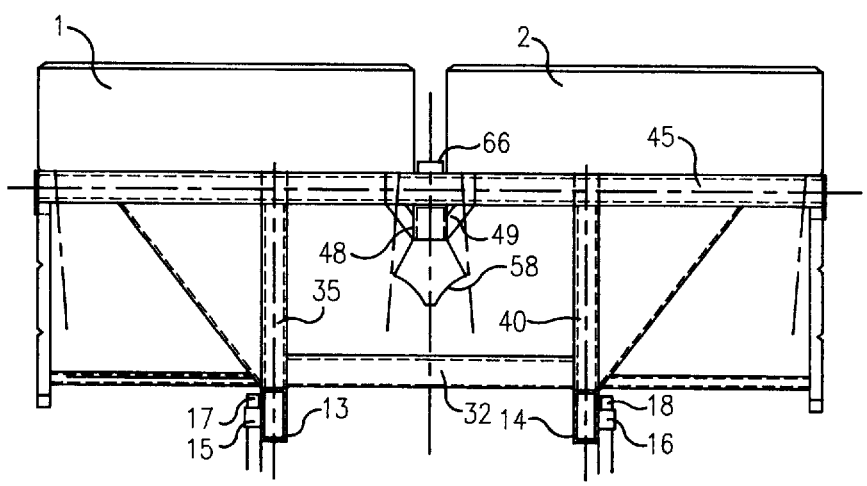
FIG. 6 is a sectional view along line VI—VI of FIG. 3.

The transport device shown in the drawing serves to accommodate multiple, identical containers 1, 2, 3, 4, 5, for the purpose of separately holding and disposing residual material from construction activities based on the composition and quality of the waste residual material. At the same time, there is the possibility of collecting the waste in different containers in such a manner that a distinction is made with respect to the purity of the grade and the stability of the quality of the residual material. The cross section of the containers 1, 2, 3, 4, 5 is rectangular and the upper end of the containers has a collar 6, which has walls 7, 8 extending parallel to each other. Below the collar 6 is a circumferential shoulder 9, starting from which the walls 10, 11 of the container 1 taper conically towards the bottom as far as the floor 12 of the container 1.

The transport device has two parallel runners 13, 14, with which it is positioned on an auxiliary frame, which is connected to the chassis of a truck (not shown in detail). The transport device is detachably locked to the auxiliary frame by means of bolts 15, 16 at the runners 13, 14 and by means of hooks 17, 18 of the auxiliary frame and with other bolts 19, 20 at the runners 13, 14 and with hooks 21, 22. In addition, the auxiliary frame has rollers 23, 24, against which the respective hooks 25, 26 of the transport device rest.

The front end of the runners 13, 14 have parallel struts 27, 28, which are spaced the same distance from each other as the runners 13, 14. Between the two struts 27, 28 there is a bow 29, by which the transport device is supposed to be pulled with a hook lift, provided on the truck, onto the truck or rolled off of the truck.

The runners 13, 14 are connected together by means of profile bars 30, 31, 32.

The runner 13 has vertically oriented support members 33, 34, 35, 36, 37 and the runner 14 also has vertically oriented support members 38, 39, 40, 41, 42. Struts 43, 44, 45, 46, 47, extending over the entire width of the transport device, are attached to the upper ends of the supports 33 to 42.

A center longitudinal beam 48, which is connected to each of the struts via attachment or reinforcing plates 49, is provided below the struts 43 to 47.

The respective outer ends of the struts 43 to 47 have outer beams 50, 51, to which the platform gates (side walls) 52, 53 are attached that are spaced via spacing bars 54 and 55 from the runners 13, 14.

The distance between the adjacent struts 43 to 47 corresponds to the length of the container 1 below the collar 6, plus a requisite movement play, so that the containers 1, 2, 3, 4, 5 can be put into the spaces formed by the struts 43 to 47, the center longitudinal beam 48 and the outer beams 50, 51 and can be lifted out of the spaces again.

The containers 1, 2, 3, 4, 5 are positioned with the shoulders 9 on the crossbars 43 to 47 and have floor space at the bottom, i.e., the walls 10, 11 do not extend to an imaginary plane defined by runners 13, 14.

Below the center longitudinal beam 48 there are in the region of the struts 43 to 47 locking profiles 56–60, which also virtually fill the space 61 between the walls 62, 63 of two laterally adjacent containers, so that the containers to be put between the struts 43 to 47 are guided first and later, after they have been deposited on the struts 43 to 47, a tilting motion relative to the outer edge of the truck is counteracted. With these locking profiles 56 to 60 the containers, which may or may not be stacked, are also held reliably in the desired vertical position.

Above the center longitudinal beam 48 there are in the region of the struts 43 to 47 spacing profiles 64, 65, 66, 67, 68, which also virtually fill the space 69 between the walls 70 and 71 of the collars 6 of two adjacent containers 1, 2, whereby the containers are also held in the desired vertical position, spaced apart from each other.

The bottom part of the mobile crane 72, with which the containers 1, 2, 3, 4, 5 are put into the transport device and are lifted out again from the transport device, is shown as a schematic drawing at the rear end of the transport device.

We claim:

1. A holding device in which containers can be positioned for transport by a vehicle, said holding device comprising:

first and second parallel runners which are intended to be located on the vehicle, said first and second runners defining corresponding front and rear ends, first and second profile bars connected between said first and second parallel runners, first, second, third, fourth and fifth equally spaced support members extending upwardly from corresponding locations along each of said first and second parallel runners so as to provide corresponding pairs of support members, first, second, third, fourth and fifth struts respectively connected to upper ends of said corresponding pairs of support members so as to extend perpendicularly to said first and second runners, each of said struts defining opposite ends, first and second outer beams connected to said first, second, third, fourth and fifth struts at respective opposite ends of said struts so as to extend in parallel with said first and second runners, and a center beam which spans said first, second, third, fourth and fifth struts so as to extend in parallel with said first and second runners, said struts, outer beams and center beam defining lattice openings in which said containers can be downwardly positioned for transport on said vehicle.

2. A holding device according to claim 1, including sixth and seventh struts extending upwardly from respective front ends of said first and second parallel runners and mounting a bow element therebetween for engagement by a hook lift mechanism on said vehicle.

3. A holding device according to claim 1, including respective locking means for positioning lower portions of adjacent containers located in said lattice openings relative to one another.

4. A holding device according to claim 3, including respective spacing means for spacing upper portions of adjacent containers located in said lattice openings relative to one another.

5. A holding device according to claim 1, including first and second side walls which respectively extend downwardly from said first and second outer beams.

6. A combination of a plurality of rectangular containers which each defines a collar at an upper rim thereof and downwardly converging walls and a holding device for said containers when transported by a vehicle, said holding device comprising:

first and second parallel runners which are intended to be located on the vehicle, said first and second runners defining corresponding front and rear ends, first and second profile bars connected between said first and second parallel runners, first, second, third, fourth and fifth equally spaced support members extending upwardly from corresponding locations along each of said first and second parallel runners, forming corresponding pairs of support members, first, second, third, fourth and fifth struts respectively connected to upper ends of said corresponding pairs of support members so as to extend perpendicularly to said first and second runners, each of said struts defining opposite ends, first and second outer beams connected to said first, second, third, fourth and fifth struts at respective opposite ends of said struts so as to extend in parallel with said first and second runners, and a center beam which spans said first, second, third, fourth and fifth struts so as to extend in parallel with said first and second runners, said struts, outer beams and center beam defining lattice openings in which said containers can be downwardly positioned for transport on said vehicle.

7. A combination as defined in claim 6, wherein said holding frame includes sixth and seventh struts extending upwardly from respective front ends of said first and second parallel runners and a bow element mounted therebetween for engagement by a hook lift mechanism on said vehicle.

8. A combination as defined in claim 6, wherein said holding frame includes respective locking means for positioning lower portions of adjacent containers located in said lattice openings relative to one another.

9. A combination as defined in claim 8, wherein said holding frame includes respective spacing means for spacing upper portions of adjacent containers located in said lattice openings relative to one another.

10. A combination as defined in claim 6, wherein said holding frame includes first and second side walls which respectively extend downwardly from said first and second outer beams.

11. A holding device according to claim 6, wherein the downwardly converging walls of said containers extend from the respective collars thereof a distance such that, when each container is positioned in a respective lattice opening, the walls will not extend to an imaginary plane defined by said parallel runners when said collar contacts the struts, outer beam and center beam defining the respective lattice opening.

12. A holding device according to claim 6, wherein the downwardly converging walls of said container extend from the respective collars thereof a distance such that, when each container is positioned in a respective lattice opening, the walls will extend to an imaginary plane defined by said parallel runners before said collar contacts the struts, outer beam and center beam defining the respective lattice opening.

\* \* \* \* \*